United States Patent [19]

Yee et al.

[11] Patent Number: 5,767,851

[45] Date of Patent: Jun. 16, 1998

[54] METHOD AND APPARATUS FOR EMULATING AN ENVIRONMENT'S DRAG AND DROP FUNCTIONALITY IN A HOST ENVIRONMENT

[75] Inventors: Michael K. Yee, Sunnyvale; Larry Cable, Mountain View; Jeff Nisewanger, San Jose, all of Calif.

[73] Assignee: Sun Microsystems, Inc., Mountain View, Calif.

[21] Appl. No.: 593,545

[22] Filed: Jan. 29, 1996

[51] Int. Cl.$^6$ .................................................. G06F 15/00

[52] U.S. Cl. ........................... 345/346; 345/329; 345/335; 345/348

[58] Field of Search ............................ 395/326, 339, 395/340, 346, 348, 349; 345/329, 330, 331, 333, 334, 335, 340, 347, 348, 349, 346

[56] References Cited

U.S. PATENT DOCUMENTS

5,487,145 1/1996 March et al. .................. 395/501
5,598,524 1/1997 Johnston et al. ................ 395/348

*Primary Examiner*—Matthew M. Kim
*Assistant Examiner*—Ba Huynh
*Attorney, Agent, or Firm*—Hecker & Harriman

[57] ABSTRACT

The present invention supports allows an emulated environment to interface with a host environment, thereby enabling drag and drop functionality of the emulated environment to function in the host environment. The look and feel of an environment's drag and drop functionality is emulated in a host environment. A drag window is created from the emulated environment's drag image. Modifier keys of the host environment are mapped to those used in the emulated environment. Windows are registered for drag and drop in the emulated environment's registered windows database. The host environment's drag and drop database is updated to identify the registered windows of the emulated environment.

20 Claims, 7 Drawing Sheets

METHOD AND APPARATUS FOR EMULATING AN ENVIRONMENT'S DRAG AND DROP FUNCTIONALITY IN A HOST ENVIRONMENT

BACKGROUND OF THE INVENTION

1. FIELD OF THE INVENTION

This invention relates to emulating an environment's drag and drop functionality in a host environment.

2. BACKGROUND

OpenStep ™ is an open, high-volume portable standard for object-oriented computing. It provides a standard application programming interface (API). The OpenStep specification is based on NeXTStep. NeXTStep ™ is an object-oriented operating system of NeXT Computer, Inc.

The NeXTStep Window Server running in the NeXT environment is a low-level process that is responsible for drawing images to the screen and sending events to applications. The NeXTStep Window Server manages the screen, keyboard, and mouse.

The NeXTStep Window Server includes a Display Postscript interpreter that performs the actual drawing of lines, text, and pictures. Postscript is a device-independent graphics description language that processes commands to perform line drawing, typesetting, and image presentation on the screen and printer output.

In addition to providing graphic user interface (GUI) capabilities, NeXTStep provides an application development environment. In addition to the development environment, the NeXTStep Application Kit, or App Kit, provides object classes for providing functionality to an application.

The NeXTStep environment runs in the Mach operating system (OS). The Mach OS is a microkernel-based operating systems. A microkernel-based OS provides a basic level of services with the bulk of the operating system services supplied by user-level services. For example, the Mach kernel provides process management, memory management, communication and Input/Output services. Services such as files and directories are handled by user-level processes.

The communication service provided by the Mach OS uses a data structure called a port. A port is analogous to a mailbox. A sender (e.g., a thread, or executable subcomponent of a process) communicates with a receiver (e.g., thread of another process) by writing a message to the mailbox, or port. The receiver retrieves the sender's message from the port.

In the above example, the sender's message is not actually stored in the port. The message is stored in a message queue. The port contains a count of the number of messages in the message queue. When a port is created, an integer that identifies the port is sent back to the creator (e.g., a thread). The identifier is used to access the port to send or receive a message.

Solaris ™ is a UNIX operating environment that can run on multiple hardware platforms such as Intel x86, SPARC, and PowerPC processors. OpenWindows ™ is a windowing system based on the X11 windowing specification that runs in Solaris. The X11/DPS is a windowing system that runs in OpenWindows. Solaris, OpenWindows, and X11/DPS are products that are available from Sun Microsystems, Inc. (Sun Microsystems, Inc., OpenWindows, X11/DPS, and Solaris are trademarks or registered trademarks of Sun Microsystems, Inc. in the U.S. and certain other countries.)

Previous drag and drop functionality for use within a single environment has been described in articles such as Marks, Stuart W., *Implementing Drag and Drop in X11*, 5th Annual X Technical Conference (Sun 1991); Beged-Dov, G. and Cohen, Ellis S., *Implementing Drag and Drop for X11*, 6th Annual X Technical Conference (1992); and Marks, Stuart W., *Drag-and-Drop Protocol Specification, OpenWindows Version 3*. It would be beneficial to provide a drag and drop functionality for an environment that is emulated in a host environment.

For example, in an environment such as the NeXTStep environment, a "findWindow" command is used to identify a window that is currently underneath the cursor. To emulate the drag and drop functionality of the NeXTStep environment, it would be beneficial to be able to locate a window during the drag and drop operation.

The NeXTStep environment provides alpha compositing. Alpha compositing specifies color and transparency percentages for images or icons on the screen. It would be beneficial to emulate the NeXTStep drag and drop operation such that the alpha compositing used in the NeXTStep environment is mapped to that used in a host environment.

An emulated environment may use modifier keys to specify a drag and drop operation that are different than those used in a host environment. It would be beneficial to map the host environment's modifier keys to those used in the emulated environment.

Further, it would be beneficial to identify the windows of the host environment that have been registered in the emulated environment as potential drop sites.

SUMMARY OF THE INVENTION

The present invention supports drag and drop components of an emulated environment within a host environment. The look and feel of a drag and drop operation of the emulated environment is emulated in the host environment. A drag window is created from the emulated environment's drag image. Modifier keys of the host environment are mapped to those used in the emulated environment. Windows are registered for drag and drop in the emulated environment's registered windows database. The host environment's window, or drag and drop, database is updated to identify the registered windows of the emulated environment.

The emulated environment maintains a registered windows database that includes an entry for each window of the emulated environment that wishes to be a drop site. When a drag and drop operation is initiated, a drag and drop database is created and updated to include all of the top level windows currently on the screen. The drag and drop database is updated to associate a top level window entry with an entry in the registered windows database. In addition to creating a drag and drop data, the emulated environment's drag image is converted for use in the host environment, if necessary.

The current position of the drag image is compared to the entries in the drag and drop database to determine if a potential drop site is underneath the current position. The drag and drop database contains a registered window's window geometry such as the window's height, width and "x and y" coordinates. The window identifier (ID) of a potential drop site is used to retrieve an port identifier (ID). The port ID can be used to communicate with the application associated with the drop site.

During the drag and drop operation, the host environment transmits a status message to the emulated environment. The status message can include the window ID, port ID, "x and y" coordinates, and window height and width. The emulated environment can process the status message. For example, the emulated environment can forward the message to the application via a port identified by the port ID.

DETAILED DESCRIPTION OF THE INVENTION

A method and apparatus for emulating an environment's drag and drop functionality in a host environment is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
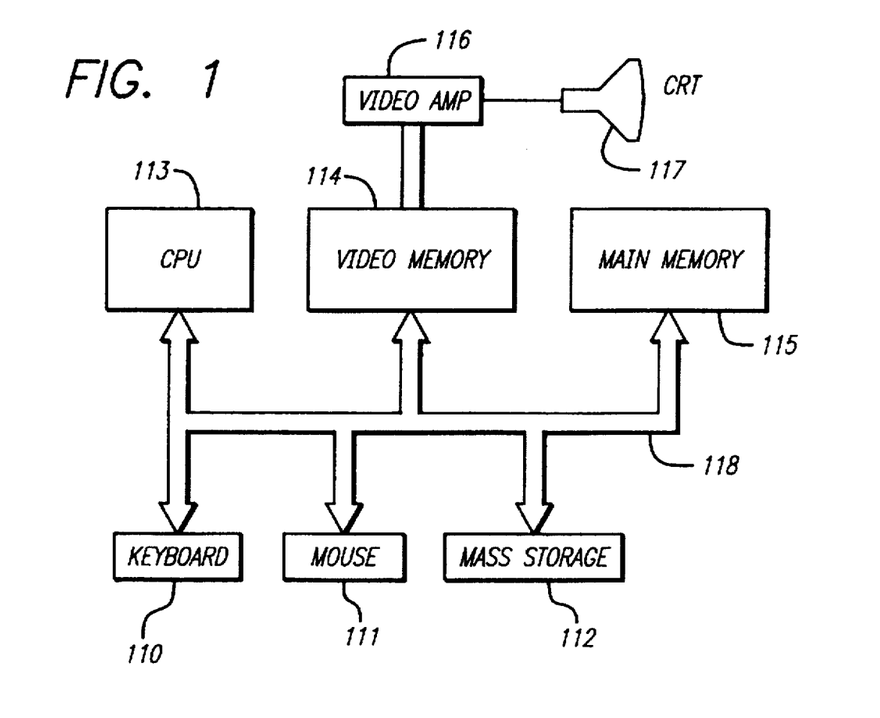
FIG. 1 provides an example of a general purpose computer to be used in accordance with embodiments of the present invention.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit microprocessor manufactured by Motorola, such as the 680X0 processor, a 80X86 microprocessor manufactured by Intel, or a SPARC microprocessor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116.

The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The present invention may be implemented in any type of computer system or programming or processing environment. When a general purpose computer system such as the one described executes the processes and process flows described herein, it is configured to emulate an environment's drag and drop functionality.

The present invention may be used with a computer system that is configured to run an environment within a window of another environment. Running an environment within a window of another environment is described in a co-pending patent application entitled Method and Apparatus for Executing and Displaying Output of an Environment in a Host Environment and is incorporated herein by reference.

By way of example, the present invention is described with reference to the NeXTStep/OpenStep environment using X11/DPS under OpenWindows on Solaris. However, it should be apparent that the functionality described herein can be used to emulate drag and drop functionality of an environment in a host environment.

Figure 2A:
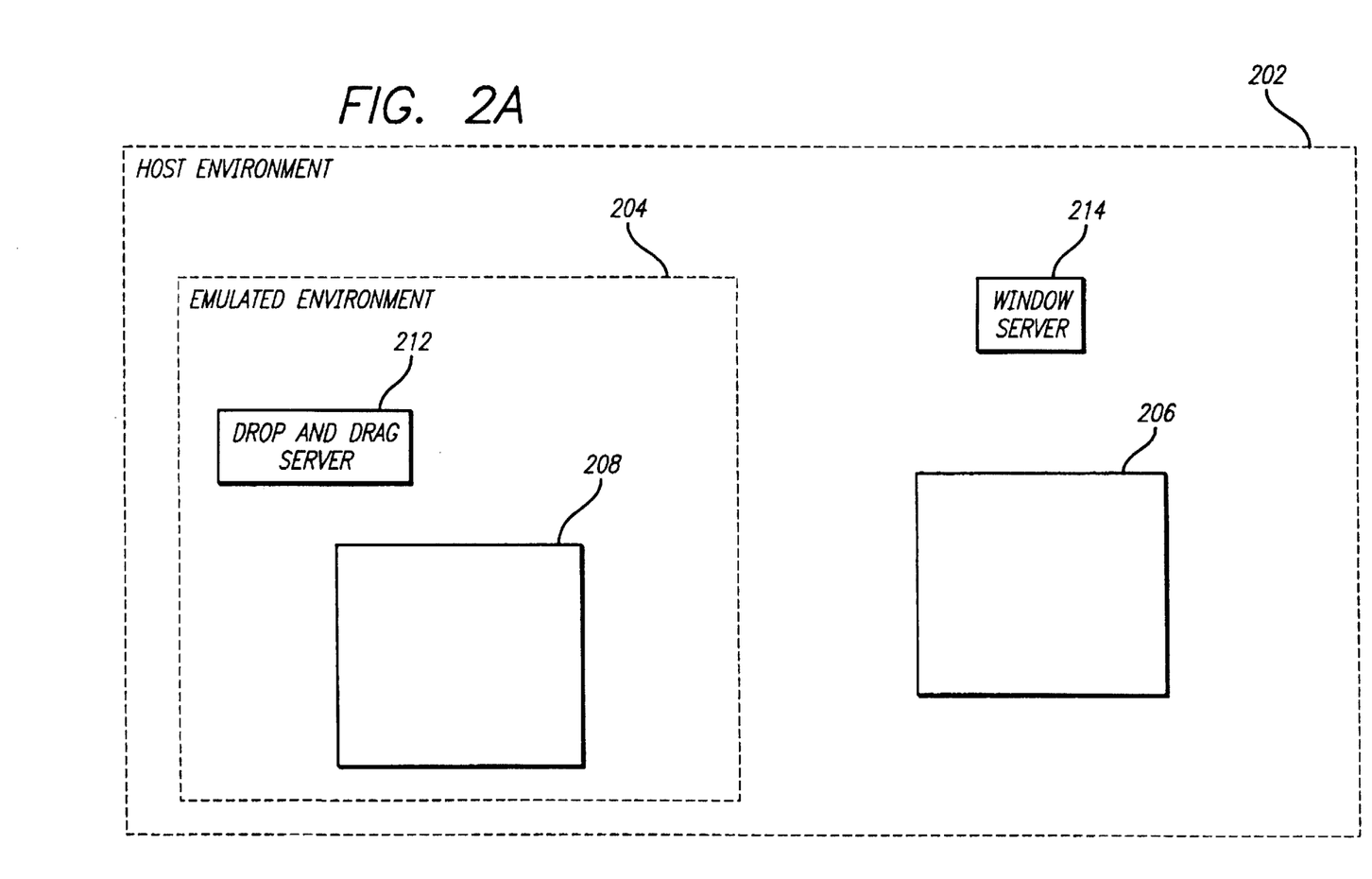
FIG. 2A provides a block-level example of an embodiment of the present invention.

Referring to FIG. 2A, an emulated environment 204 is running in host environment 202. Host environment 202 includes window 206. Applications can be run in host environment 202. Window 206 is used to display output of an application running in host environment 202, for example.

Emulated environment 204 runs in host environment 202. Emulation of an environment in a host environment is described in a co-pending United States Patent Application entitled "Method and Apparatus for Executing and Displaying Output of an Environment in a Host Environment", Ser. No. 08/593,712, filed on Jan. 29, 1996, assigned to the assignee of the present invention, and incorporated herein by reference. Applications can be executed in emulated environment 204 running in host environment 202. Output generated by an application of emulated environment 204 is displayed in a window of host environment 202. Window 208 is used to display output of an application running in emulated environment 202, for example. Windows 206 and 208 are windows that are created in host environment 202.

Figure 2B:
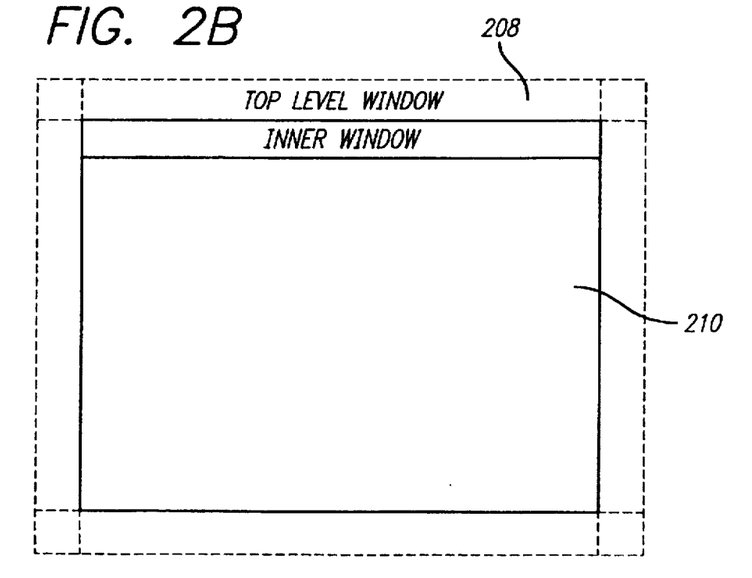
FIG. 2B provides an example of window 208 of FIG. 2A in a hierarchical windowing system.

Using the present invention, emulated environment 204 includes a drag and drop functionality that interfaces with host environment 202. Thus, for example, the drag and drop functionality interfaces with the windowing system of the host environment. For example, X11/DPS under OpenWindows on Solaris implements a hierarchical windowing system. FIG. 2B provides an example of window 208 of FIG. 2A in a hierarchical windowing system. Window 208 is a top level window that acts as a root or parent of a plurality of child windows. Inner window 210 is a child of top level window 208, for example.

DRAG AND DROP DATABASE

Preferably, host environment 202 maintains windows 206 and 208. Host environment 202 maintains information concerning windows 206 and 208. Preferably, host environment 202 maintains a drag and drop database that includes an entry for each window currently opened in host environment 202. That is, the drag and drop database includes an entry for windows in host environment 202 and emulated environment 204 (e.g., windows 208 and 206 of FIG. 2A and window 210 of FIG. 2B). Preferably, window server 214 of host environment 202 maintains the drag and drop database.

The drag and drop database includes window information such as a window identifier ("ID") and the current location and dimensions of each window on the screen. The window ID uniquely identifies a window. The current location can be defined by the current "x and y" coordinates of the window. The dimension of the window is specified by height and width values, for example. Using the "x and y" coordinates and the height and width specifications, it is possible to determine the extents of the window relative to a current cursor location. Where the windowing system is comprised of a hierarchical structure, hierarchical information is preferably maintained by the windowing system. Thus, for example, a top level window identifies its child windows and/or a child window identifies its parent window.

Emulated environment 204 includes functionality to maintain information about its windows. For example, emulated environment 204 identifies those windows that have registered for a potential drag and drop operation. During a drag and drop operation, registration information is used to identify a port associated with an application that is interested in participating in a drag and drop. Preferably, emulated environment 204 maintains a registered windows database that includes an entry for each window that is registered for drag and drop. Emulated environment 204 maintains the registered windows database. Preferably, a drag and drop server such as server 212 of emulated environment 204 maintains the registered windows database.

Preferably, when an application wishes to register for drag and drop, it sends a "register" message to emulated environment 204. Upon receipt of the message, emulated environment 204 creates an entry in the registered windows database. An application can update its entry by sending an "update" message. An entry is removed from the registered windows database using an "unregister" message.

The registered windows database includes information that can be used to identify a window and its associated application. Preferably, an entry contained in the registered windows database includes a window ID and a port identifier ("ID"). The window ID uniquely identifies a window in the drag and drop database. It is generated by the windowing system's window server, for example. The port ID provides information for communicating with the application associated with the window. For example, the port ID identifies a port such as those used in the Mach Operating System.

In the preferred embodiment of the present invention, the drag and drop database of host environment is modified to reflect information contained in the registered windows database. In so doing, host environment 202 can monitor cursor movement and determine whether an application of emulated environment 204 is registered for drag and drop. Using the information contained in the drag and drop database, host environment 202 can communicate the status of a drag and drop operation to emulated environment 204.

DRAG AND DROP

Figure 3:
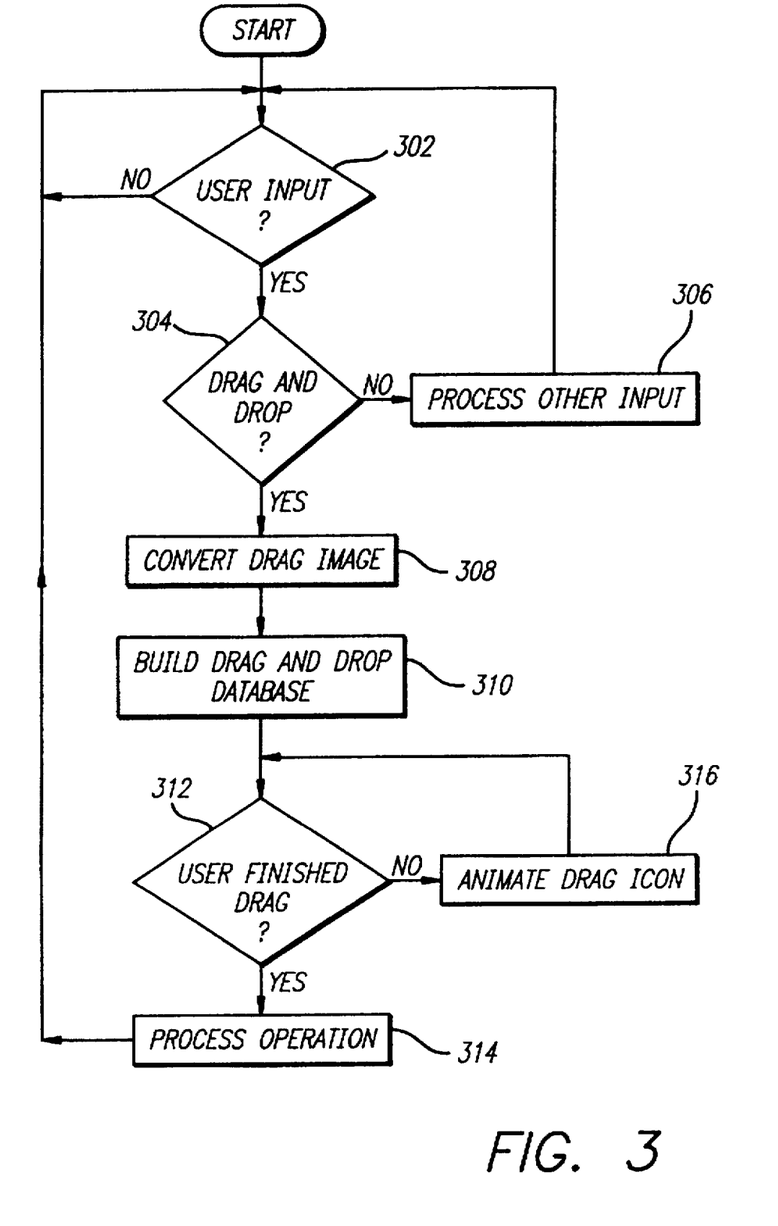
FIG. 3 provides an example of a flow for processing a drag and drop operation according to an embodiment of the present invention.

A drag and drop operation is normally initiated when a user selects an object displayed on the screen by depressing the appropriate mouse button. FIG. 3 provides an example of a flow for processing a drag and drop operation according to an embodiment of the present invention.

At step 302 (i.e., "user input?"), a determination is made whether a there is user input. If not, processing continues at step 302 to wait for user input. If there is user input, processing continues at step 304. At step 304 (i.e., "drag and drop?"), if a drag and drop operation is initiated by the user input, processing continues at step 308. If not, processing continues at step 306 to process the user input.

Preferably, feedback is provided to the drag and drop user by dragging an icon on the screen. The movement of the icon, or drag image, is responsive to the movement of the mouse by the user. A user of emulated environment 204 expects to see a drag image of emulated environment 204. Thus, host environment 202 preferably emulates the drag image of the emulated environment. At step 308, the drag image of emulated environment 204 is converted for use by host environment 202.

At step 310, a drag and drop database is built. For example, the drag and drop database is built by initializing the database with a current list of top level windows obtained from the host environment and merging the contents of the drag and drop database with the entries in the emulated environment's registered windows database. At step 312 (i.e., "user finished drag?"), a determination is made whether the user has completed the drag and drop operation (e.g., by releasing mouse button). If not, processing continues at step 316 to provide animation of the drag icon. For example, the drag icon is moved along the screen to mirror the movement of the mouse to provide feedback to the user. Processing continues at step 312 to determine whether the drag operation is complete. If, at step 312, a determination is made that the user has completed the drag operation, processing continues at step 314. At step 314, the drag and drop operation is processed. Processing continues at step 302 to await user input.

DRAG AND DROP IMAGE

As previously described, an user of emulated environment expects to see the drag image of the emulated environment displayed as feedback during the drag and drop operation. Thus, for example, host environment 202 emulates the drag image of emulated environment 204 during a drag and drop operation.

In the NeXTStep/OpenStep environment, for example, an image has two color components: color and alpha. Color specifies how a color looks when it is displayed on an empty background (e.g., white background on a black-and-white system). Alpha is the measure of the color's transparency. Alpha indicates how to blend a color with a color of the image with a background color.

It may be necessary to convert a drag image of the emulated environment for use in the host environment. For example, the alpha compositing capabilities of a NeXTStep/OpenStep is converted to the X11/DPS environment. Thus, a drag image in the NeXTStep/OpenStep environment is converted for use in a Solaris operating environment such as Solaris 2.x running OpenWindows and X11/DPS. The Solaris operating environment uses a solid rectangle that can be shaped by defining that part of the image that is opaque or transparent, for example. A drag image in the NeXTStep/OpenStep environment is mapped to the Solaris environment by mapping the alpha compositing of the drag image to opaque and transparency values of a drag window in the Solaris environment. The result is a drag window that emulates the drag image of the emulated environment. The window used for the conversion is created once and cached for subsequent use.

Figure 4:
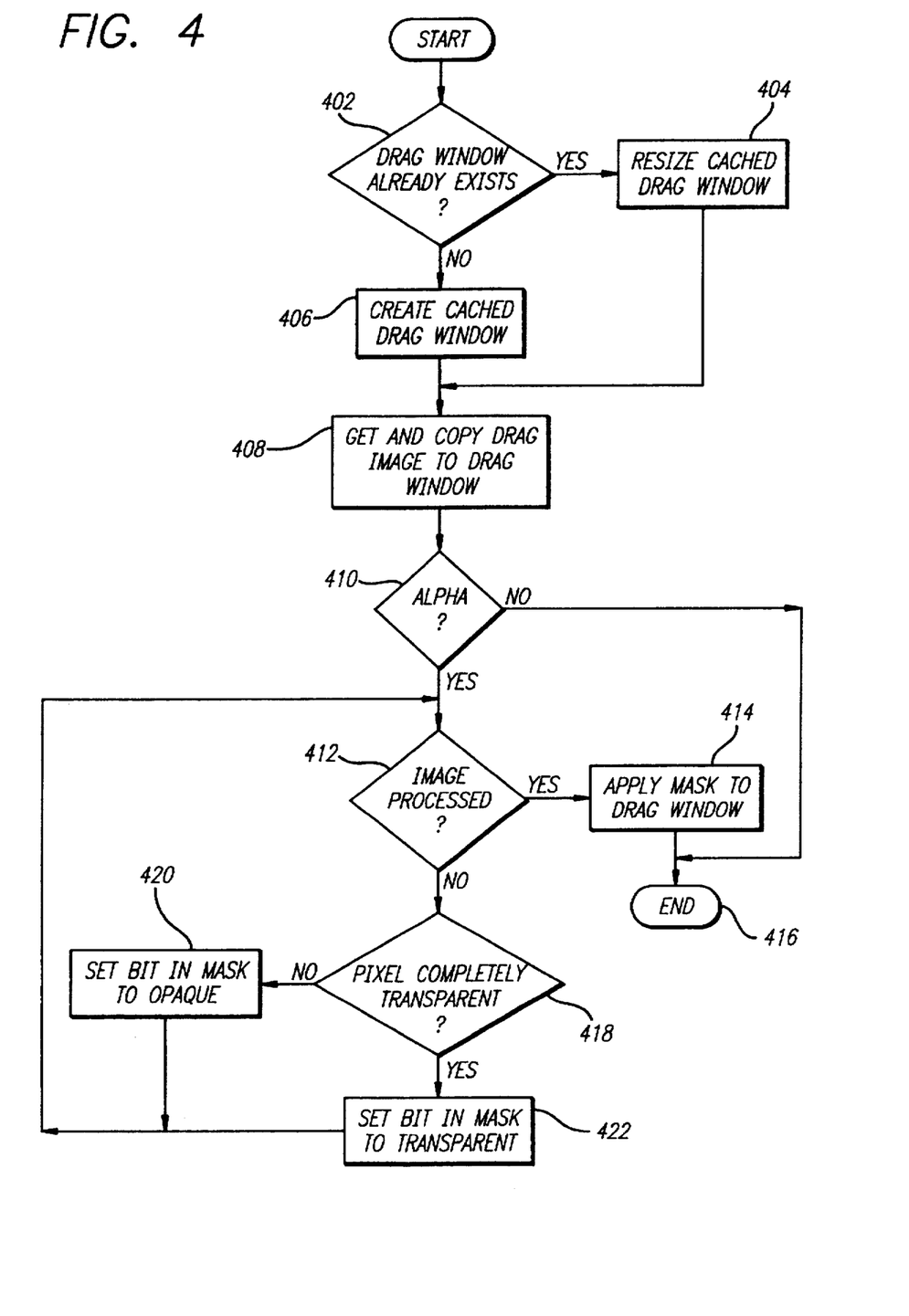
FIG. 4 provides an example of conversion of a drag image according to an embodiment of the present invention.

FIG. 4 provides an example of conversion of a drag image according to an embodiment of the present invention. At step 402 (i.e., "drag window already exists?"), a determination is made whether the drag window has already been created and cached. If so, processing continues at step 404 to resize the cached drag window. Processing continues at step 408. If not, processing continues at step 406 to create a cached drag window. Processing continues at step 408.

At step 408, the drag image is retrieved from storage and copied into the drag window. At step 406 (i.e., "alpha?"), a determination is made whether the image uses alpha compositing. If not, processing ends at step 416. At this point, the drag window is available for display and animation during an user drag operation.

If it is determined at step 406 that alpha compositing is used, processing continues at step 412 to process the drag image. The drag image is processed by examining the alpha setting for each pixel of the drag image. A pixel's alpha setting is set to either transparent or opaque. A mask is created that contains the mapping from alpha to transparent/opaque. At step 412 (i.e., "image processed?"), a determination is made whether the image has been processed.

If it is determined at step 412 that the drag image is not completely processed, processing continues at step 418. At step 418 (i.e., "pixel completely transparent?"), a determination is made whether the current pixel in the drag image is completely transparent. If it is, processing continues at step 422 to set the mask bit associated with the current pixel to transparent. If not, processing continues at step 420 to set the mask bit to opaque. In either case, processing continues at step 412 to process any remaining pixels.

If it is determined at step 412 that the drag image has been processed, processing continues at step 414 to apply the mask to the drag window. Processing ends at step 416. The resulting drag window can be subsequently displayed and animated during an user drag operation.

DRAG AND DROP DATABASE CREATION

Figure 5:
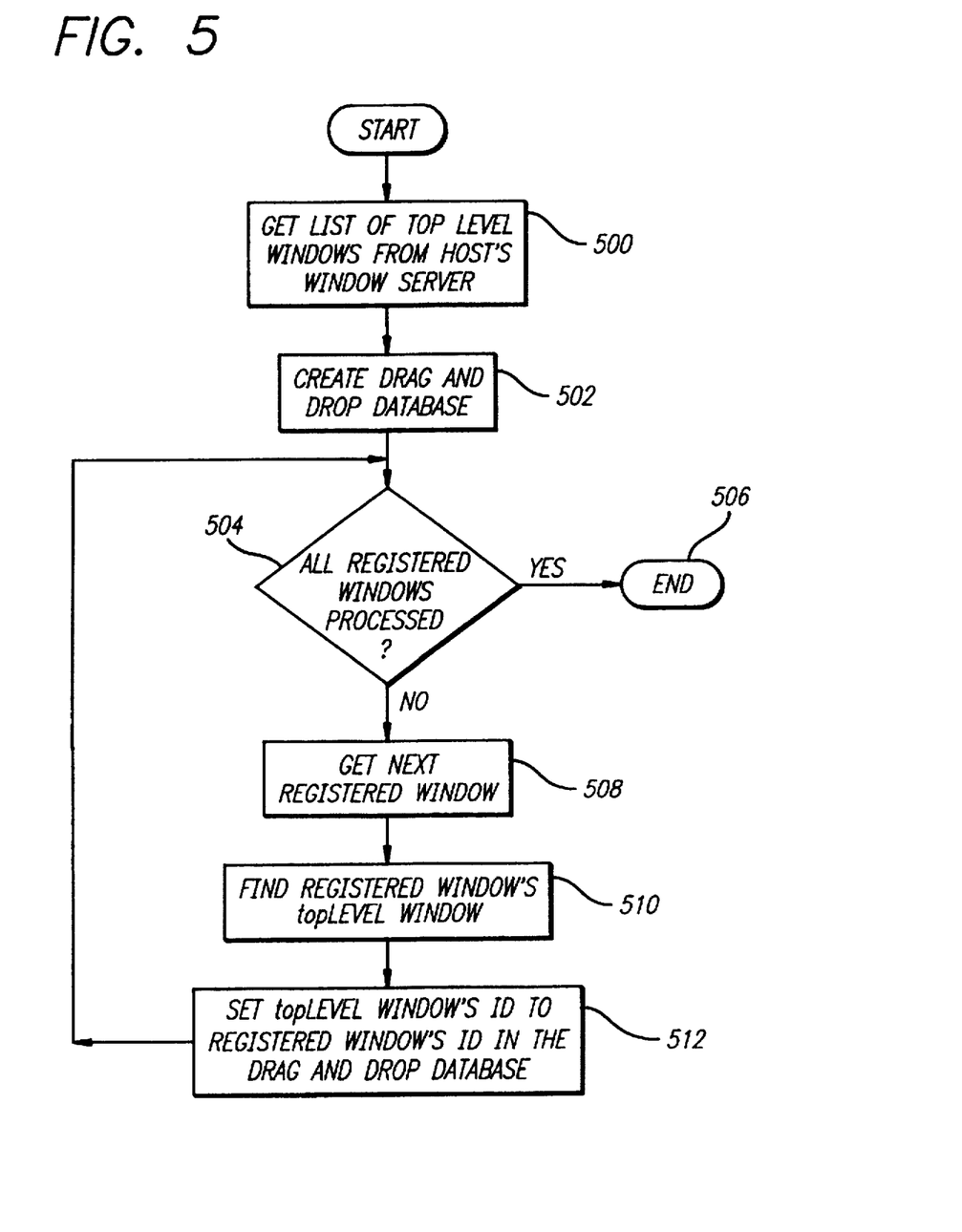
FIG. 5 provides a process flow for building a drag and drop database according to an embodiment of the present invention.

According to an embodiment of the present invention, the drag and drop database of the host environment is built to reflect information contained in the registered windows database of the emulated environment. FIG. 5 provides a process flow for building a drag and drop database according to an embodiment of the present invention. The process flow is invoked at the start of drag and drop operation processing.

At step 500, a list of top level windows is obtained from the host environment's window server. At step 502, the drag and drop database is created and updated to include the list of top level windows retrieved from the host environment's window server. The drag and drop database includes all of the top level windows currently on the screen. At step 504 (i.e., "all registered windows processed?"), a determination is made whether all of the registered windows have been processed. If yes, processing ends at step 506. If not, processing continues at step 508.

At step 508, the next registered window is retrieved from the registered window database. At step 510, the registered window's counterpart in the drag and drop database is located. When the host environment uses a hierarchical window structure, the registered window's counterpart is its top level window. The top level window is found by traversing the window hierarchy in the drag and drop database. The window ID of the registered window is used to set the window ID of its counterpart in the drag and drop database at step 512. The window geometry of the registered window's top level window is used to determine whether the current cursor position is located with the window. Processing continues at step 504 to process any remaining registered windows.

DRAG AND DROP OPERATION

Figure 6:
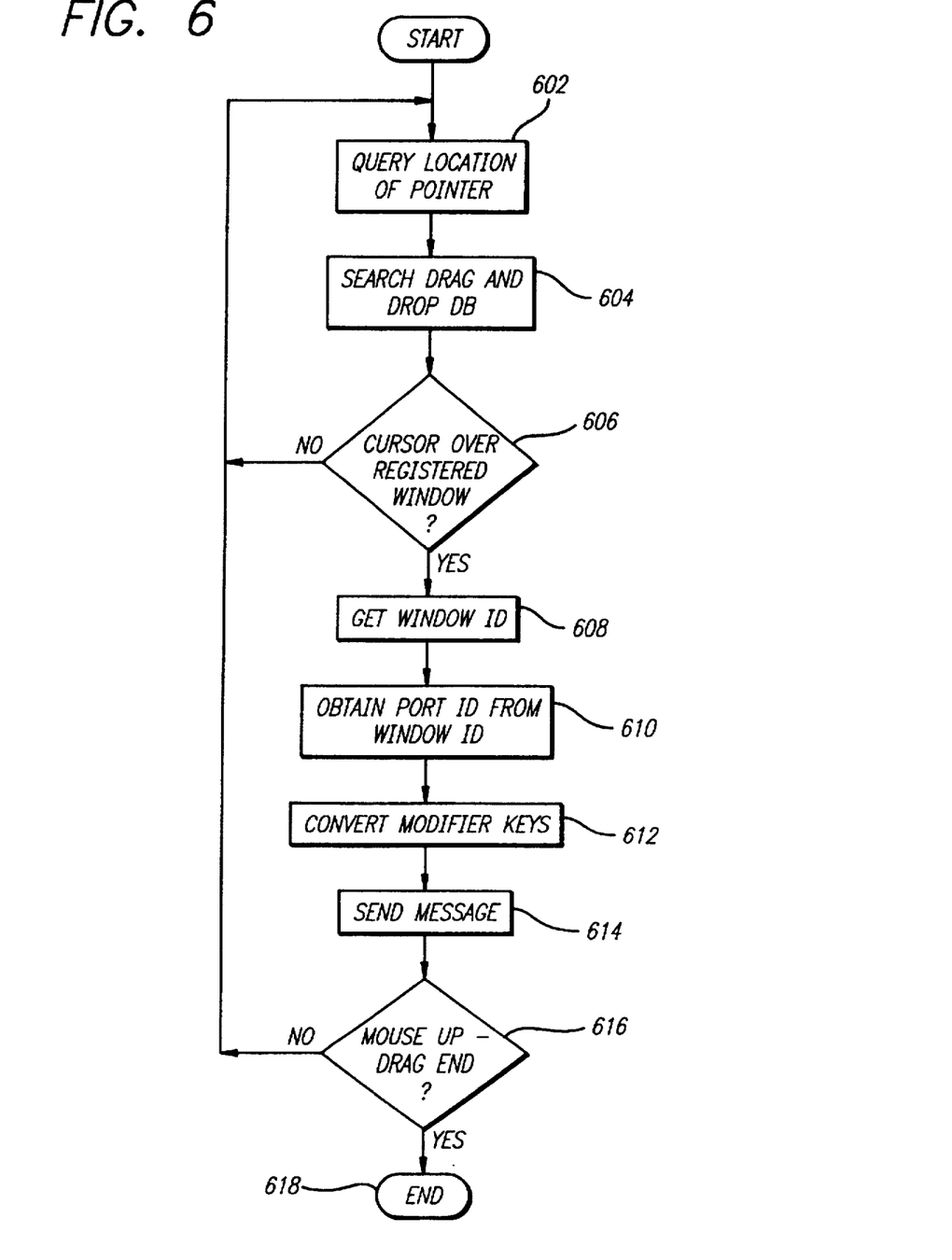
FIG. 6 provides a process flow for processing a drag and drop operation according to an embodiment of the present invention.

The movement of the drag image is tracked across the screen. If there is a window located underneath the image, the communication path to the associated application is identified. The host environment notifies the emulated environment of the status of the operation. FIG. 6 provides a process flow for processing a drag and drop operation according to an embodiment of the present invention.

At step 602 a query is made to determine the current position of the cursor and the keyboard entry, if used. At step 604, the drag and drop database is searched to determine whether the current position of the cursor, or drag window, is over a window. At step 606 (i.e., "cursor over a registered window?"), a determination is made whether the drag image is over a window that is registered for drag and drop. If it isn't processing continues at step 612.

If the drag window is over a window, processing continues at step 608. At step 608, the window ID of the window is retrieved from the drag and drop database. At step 610, the port ID, or communication path, is retrieved from the registered windows database. Processing continues at step 612.

Modifier keys can be used to specify the specific drag and drop operation. For example, a modifier key can be used to specify a move, copy, or link operation. The modifier keys used in the emulated environment may be different than those used in the host environment. In this case, the modifier keys of the host environment are converted to those used in the emulated environment.

At step 612, the modifier keys of the host environment are converted to those used in the emulated environment. At step 614, a message is transmitted to the emulated environment. The message can include, for example, the window ID of the window underneath the current cursor position, the "x and y" coordinates, an operation mask that identifies the emulated environment's modifier keys, and the default operation. The emulated environment then processes the message normally. For example, the emulated environment forwards the message to the associated application in the emulated environment.

At step 616 (i.e., "mouse up - drag end?"), the user's input (e.g., mouse button input) is examined to determine whether the drag operation is complete. If the user's input does not indicate that the drag operation is complete, processing continues at step 602 to determine the current location of the cursor, or mouse pointer. If the input from the user indicates that the drag operation is finished, processing ends at step 618.

MODIFIER KEY MAPPING

Figure 7:
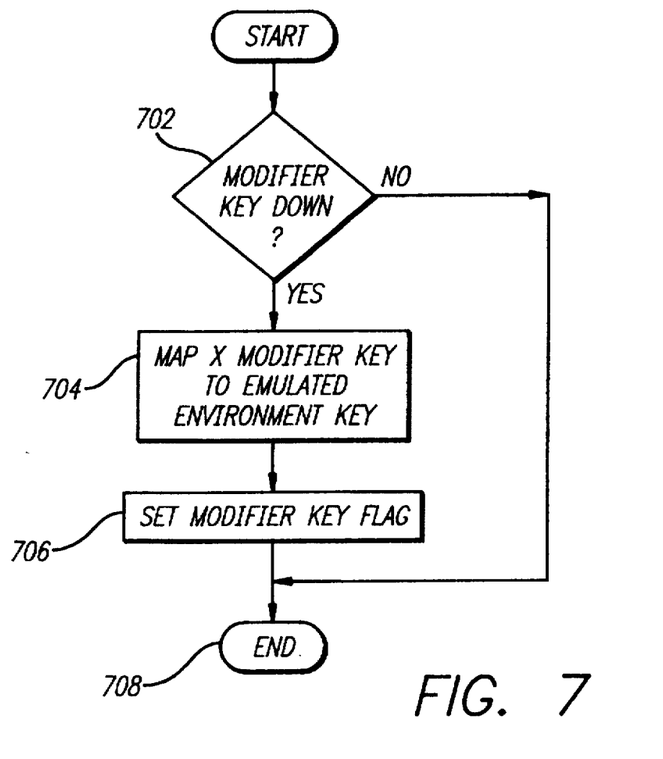
FIG. 7 provides a process flow for processing modifier keys according to an embodiment of the present invention.

As previously indicated, the modifier keys of the host environment may be different from those used in the emulated environment. For example, a copy operation may be indicated in the host environment using a different key than the one used in the emulated environment. In this case, the host environment maps its key to the key used in the emulated environment. When the host environment communicates the status of a drag and drop operation, it specifies the emulated environment's key. Thus, the emulated environment can process the modifier key normally. FIG. 7 provides a process flow for processing modifier keys according to an embodiment of the present invention.

At step 702 (i.e., "modifier key down?"), a determination is made whether a modifier key was used. If not, processing continues at step 708. If a modifier key was used, processing continues at step 704. At step 704, the host environment's modifier key is mapped to the emulated environment's key designation. At step 706, a flag, or mask, is set to indicate the emulated environment's key designation. Processing ends at step 708.

Thus, a method and apparatus for emulating an environment's drag and drop functionality in a host environment has been described in conjunction with one or more specific embodiments. The invention is defined by the claims and their full scope of equivalents.

We claim:

1. A method of emulating an emulated environment's drag and drop operation in a host environment comprising the steps of:

maintaining a database of each window in said emulated environment and said host environment;

relating a window of said emulated environment registered for drag and drop with an entry in said database;

generating a drag window of said host environment using a drag image of said emulated environment;

tracking a movement of said drag window;

identifying said window of said emulated environment registered for drag and drop as a site of said drag and drop operation using said database.

2. The method of claim 1 wherein said step of generating further comprises the step of converting the alpha aspect of said drag image.

3. The method of claim 2 further comprising the steps of:

examining the alpha setting of a pixel of said drag image;

setting the degree of transparency of a corresponding pixel of a drag window of said host environment to wholly transparent if said alpha setting specifies complete transparency; and setting the degree of transparency of said corresponding pixel to opaque if said alpha setting does not indicate complete transparency.

4. The method of claim 1 further comprising the step of communicating the status of said drag and drop operation to said emulated environment.

5. The method of claim 1 wherein said step of relating further comprises the steps of:

maintaining a registered windows database, said registered windows database containing an entry for a window of said emulated environment registered for drag and drop;

retrieving said entry from said registered windows database;

locating an entry of said database that corresponds to said entry from said registered windows database; and assigning a window identifier (ID) of said registered windows database entry to said window ID of said database entry.

6. The method of claim 5 wherein said host environment creates a hierarchy of windows, said corresponding entry of said database is a top level window of said registered window of said emulated environment.

7. The method of claim 1 further comprising the step of mapping a modifier key of said host environment to a modifier key of said drag and drop operation.

8. An article of manufacture comprising:

a computer usable medium having computer readable program code embodied therein for emulating an emulated environment's drag and drop operation in a host environment, said computer readable program code in said article of manufacture comprising:

computer readable program code configured to cause a computer to maintain a database of each window in said emulated environment and said host environment;

computer readable program code configured to cause a computer to relate a window of said emulated environment registered for drag and drop with an entry in said database;

computer readable program code configured to cause a computer to generate a drag window of said host environment using a drag image of said emulated environment;

computer readable program code configured to cause a computer to track a movement of said drag window;

computer readable program code configured to cause a computer to identify said window of said emulated environment registered for drag and drop as a site of said drag and drop operation using said database.

9. The article of manufacture of claim 8 wherein said program code configured to cause a computer to generate a drag window further comprises:

computer readable program code configured to cause a computer to convert the alpha aspect of said drag image.

10. The article of manufacture of claim 9 further comprising:

computer readable program code configured to cause a computer to examine the alpha setting of a pixel of said drag image;

computer readable program code configured to cause a computer to set the degree of transparency of a corresponding pixel of a drag window of said host environment to wholly transparent if said alpha setting specifies complete transparency; and computer readable program code configured to cause a computer to set the degree of transparency of said corresponding pixel to opaque if said alpha setting does not indicate complete transparency.

11. The article of manufacture of claim 8 further comprising:

computer readable program code configured to cause a computer to communicate the status of said drag and drop operation to said emulated environment.

12. The article of manufacture of claim 8 wherein said program code configured to cause a computer to relate further comprises:

computer readable program code configured to cause a computer to maintain a registered windows database, said registered windows database containing an entry for a window of said emulated environment registered for drag and drop;

computer readable program code configured to cause a computer to retrieve said entry from said registered windows database;

computer readable program code configured to cause a computer to locate an entry of said database that corresponds to said entry from said registered windows database; and computer readable program code configured to cause a computer to assign a window identifier (ID) of said registered windows database entry to said window ID of said database entry.

13. The article of manufacture of claim 12 wherein said host environment uses a hierarchy of windows, said corresponding entry of said database is a top level window of said registered window of said emulated environment.

14. The article of manufacture of claim 8 further comprising:

computer readable program code configured to cause a computer to map a modifier key of said host environment to a modifier key of said drag and drop operation.

15. An apparatus comprising:

a central processing unit (CPU), said CPU configured to execute an emulated environment and a host environment;

a window server coupled to said emulated environment and said host environment, said window server capable of providing a drag window of said host environment using a drag image of said emulated environment; and a drop and drag server coupled to said emulated environment.

16. The apparatus of claim 15 wherein said window server creates a database of each window of said emulated environment and said host environment.

17. The apparatus of claim 15 wherein said drop and drag server maintains a registered windows database of all windows of registered for drag and drop.

18. The apparatus of claim 15 wherein said window server tracks the current position of a cursor during a drag and drop operation.

19. The apparatus of claim 18 wherein said window server identifies one of said registered windows as a drop site for said drag and drop operation.

20. The apparatus of claim 19 wherein said window server communicates the identification of said registered window to said emulated environment.

* * * * *